(12) United States Patent
Cheng

(10) Patent No.: US 9,038,665 B2
(45) Date of Patent: May 26, 2015

(54) IRRIGATION SYSTEM ORIENTED VALVE SYSTEM

(71) Applicant: Chi-Han Cheng, Taichung (TW)

(72) Inventor: Chi-Han Cheng, Taichung (TW)

(73) Assignee: YUAN-MEI CORP., Taichung (TW)

( * ) Notice: Subject to any disclaimer, the term of this patent is extended or adjusted under 35 U.S.C. 154(b) by 108 days.

(21) Appl. No.: 13/986,174

(22) Filed: Apr. 9, 2013

(65) Prior Publication Data

US 2014/0299213 A1    Oct. 9, 2014

(51) Int. Cl.
*F16K 11/24* (2006.01)
*F16K 11/085* (2006.01)
*F16K 31/40* (2006.01)

(52) U.S. Cl.
CPC ............... *F16K 11/24* (2013.01); *F16K 31/404* (2013.01); *F16K 11/085* (2013.01)

(58) Field of Classification Search
CPC ....... F16K 31/404; F16K 11/20; F16K 11/24; F16K 11/085; A01G 25/165
USPC .......... 137/883, 385, 614.16, 614.17, 614.19, 137/614.21; 251/117, 118
See application file for complete search history.

(56) References Cited

U.S. PATENT DOCUMENTS

| 3,520,327 A | * | 7/1970 | Abbott et al. | 137/556.6 |
| 5,655,747 A | * | 8/1997 | Pasut | 251/30.03 |
| 6,340,034 B1 | * | 1/2002 | Arnott et al. | 137/883 |
| 6,986,364 B1 | * | 1/2006 | Wang | 137/624.11 |
| 8,166,704 B1 | * | 5/2012 | Sydlowski | 47/48.5 |
| 2004/0187934 A1 | * | 9/2004 | Hwang | 137/601.14 |

* cited by examiner

*Primary Examiner* — John Fox
*Assistant Examiner* — Michael R Reid
(74) *Attorney, Agent, or Firm* — Raymond Y. Chan; David and Raymond Patent Firm

(57) ABSTRACT

A valve system oriented for an irrigation system which is activated by a control unit is disclosed. The system comprises a solenoid switch and a manual switch, wherein an electrical wire extends from the valve to the control unit. The manual switch operates as a hand handling rotating lever; another use of manual switch is to serve as a means to force close the solenoid valve's outlet opening so as to provide a mechanism responsive to preventing automatic opening of solenoid valve controlled by control unit.

11 Claims, 13 Drawing Sheets

IRRIGATION SYSTEM ORIENTED VALVE SYSTEM

BACKGROUND OF THE INVENTION

1. Fields of the Invention

This invention relates to a system of valves subject to activation by automatically controlled irrigation system, and more particularly, to valves activated by solenoid switches for automatic water supply which can work to force close solenoid controlled water passage way.

2. Descriptions of Related Art

In one prior patent application filed by the current inventor, U.S. application Ser. No. 12/926397, the disclosed technical features show a magnetic control valve, comprising a connection pipe (40), a rubber ring (50), a magnetic control switch (600); wherein the connection pipe (40) has a water inflow passage (41) and a water outflow passage (42), and an engaging place between an outlet end of the water inflow passage and an inlet end of the water outflow passage has a circular seat having an outward opening; the rubber ring fit in a bottom of the circular seat, wherein a bottom of the rubber ring seals the outlet end and the inlet end, and the rubber ring has a valve corresponding to the inlet end and communicating water passages corresponding to the outlet end; the magnetic control switch assembled to the circular seat and comprising a pipe seat wound by an electromagnetic coil, the electromagnetic coil connected to a magnetic pole switch, an inside of the pipe seat divided into an upper pipe body space and a lower pipe body space, a magnetic sucking element installed to the upper pipe body space, a valve rod capable of moving installed to the lower pipe body space, a bottom of the valve rod having a valve plug to seal or open the valve by displacing and regulating the valve plug, the characterized in that: the rubber ring combined to a metal plate capable of being attracted by magnetic force, the valve rod being a magnetic element carrying permanent magnetic force so that a magnetic field generated by the electromagnetic coil is regulated by the magnetic pole switch to drive the valve plug of the valve rod to seal the valve of the rubber ring, thereby achieving an optimum sealing effect through mutually magnetic attraction between the metal plate and the valve rod.

SUMMARY OF THE INVENTION

A primary objective of the present invention is to provide a valve system that has streamlined maneuverability of operating and closing of valves.

In order to achieve the foregoing objective for providing a valve system used for multiple regional irrigation, the current invention comprises a system having more than one valve for specifically dispensing for irrigation toward a target area, for example the target area may cover multiple unit areas, and each valve moderates the connection between a water conduit and a water sprinkler head. The water sprinkler head receives the water introduced from the conduit, for which the conduit is connected to a solenoid valve switch and a manual valve switch, which mechanically actuate the valve in the valve system to open or seal the conduit.

The irrigation friendly valve system is designed in such a way to handle opening or closing for receipt of fluid and guidance for the fluid going to a conduit, water may be an example of the fluid. Irrigation fluid refers any fluid that can be used for fostering vegetation. Therefore, the irrigation system as understood in the context of one for designating multiple water conduits to specific target areas refers to any device targeted for distributing water supply, such as pop-up sprinklers, rotating sprinklers, sprinkler tip, or a drip irrigation system. Water is provided with water conduit and distributed to each target irrigation area (now shown in Figures). Water flow regulation is defined and controlled by the valve, which can be chosen at the user's discretion to allow water flow to go to a specified water conduit in a specified period of time, thereby effectively designating water supply from the conduit to the specified irrigation system.

The irrigation oriented valve system involves a group of valves operating under direction of a control unit. The valve system comprises a main body, a water inlet, a manifold, a water outlet, a solenoid switch and a manual switch, wherein the main body is a casing for building an assembly, the water inlet is disposed on one end of the main body, the manifold is a part that diverges into one or more than one water channels, wherein each manifold is internally disposed with a manual switch and a solenoid switch, the manual switch is disposed at a position relative to the solenoid switch, and extends in one body from one terminal of the manifold to connect with a water outlet pipe.

The solenoid valve switch houses an electrical wire extending to a control unit, the solenoid valve switch comprises: a connecting pipe, a valve, a valve stem, and a magnet; wherein one end of the connecting pipe is a sealed end and another end of the connecting pipe is an open end, the valve is disposed at an engaging place between the open end of the connecting pipe and the first water passage.

The valve is encapsulated inside the connecting pipe, having a valve plug with a conical shape on one of its terminal, and a magnet on another terminal. The valve plug can work to provide an actuating mechanism to seal or open the valve at the open end of the connecting pipe. The valve connects with the first water passage relatively to the aforementioned open end.

The valve stem is attached to the connecting pipe and there is disposed on the outside of the connecting pipe with a solenoid wire, the solenoid wire is connected to a magnet, and the connecting pipe has a partition wall for partitioning a space into a front-end space and a back-end space, a magnet is disposed inside the back-end space, and a movable valve stem is disposed inside the front-end space, a distal end of the valve stem has a conical valve plug, which can work, by way of mechanical displacement, to seal or open the aforementioned valve.

Additionally, the manual valve switch comprises: a rotating lever, a valve, a positioning device, the function of the rotating lever is to allow an axial rotational motion for the valve so as to provide another mechanism for controlling sealing and opening of the valve. The valve discussed here is a cylindrical valve, and has an opening end for serving as a water outflow window, the positioning device comprises a spring and a protruding peg, the protruding peg has an expansion portion and a shrinkage portion, an end of the spring is inserted into the shrinkage portion to push against the expansion portion, another end of the spring is inserted into a predetermined storage portion of the manifold, and the expansion portion is configured to protrude outwardly from an outer surface of the manifold after assembly is complete so as to allow multi-tiered positioning capability for the rotating lever.

With the above summary, it should now be apparent to skilled persons in the related field of technology to recognize that the manual switch can be used as a means to preemptively close the water outlet of the solenoid valve, so as to prevent the default sealing functionality of the solenoid valve as directed by the control unit when it is operating under an automatic mode to open the valve for water outflow.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 3-1 is an enlarged view of a third water passage of the solenoid switch.

DETAILED DESCRIPTION OF THE PREFERRED EMBODIMENT

Figure 1:
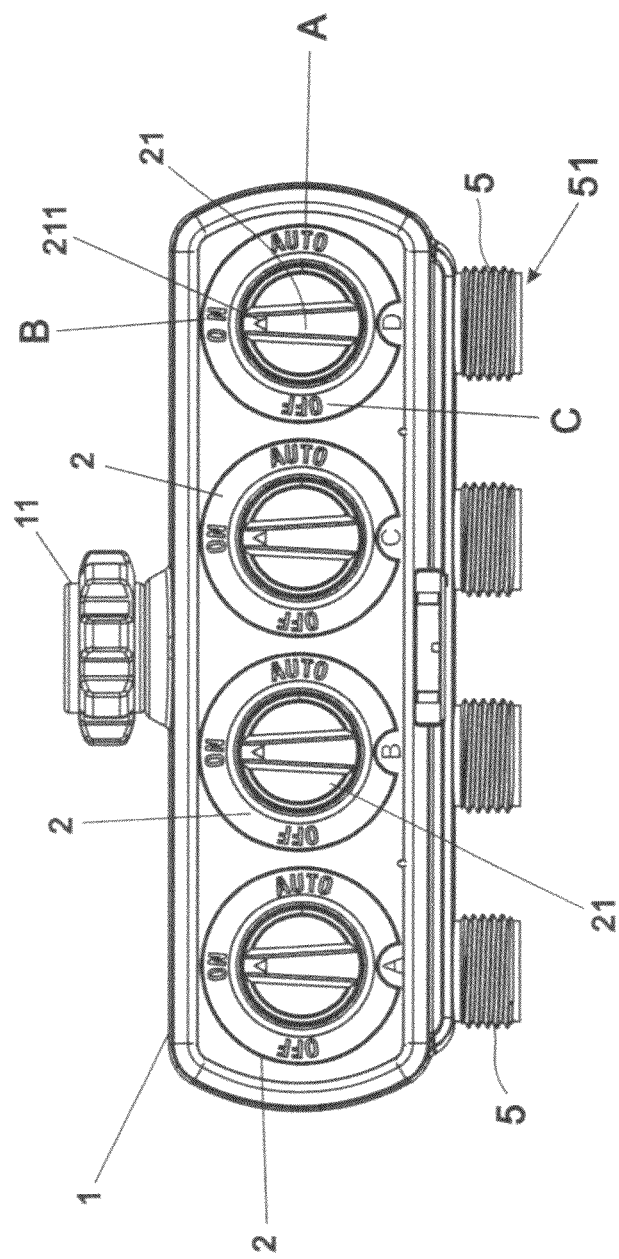
FIG. 1 is a frontal view of a valve according to the current invention.

As shown in FIGS. 1 through 13, the drawings show that the irrigation oriented valve system comprises a main body 1, water inlet conduit 11, manifold 4, water outlet conduit 5, multiple water chambers 41, multiple solenoid switches 3 and multiple manual switches 2, wherein the main body 1 is a basic outer casing of a valve, the main body 1 is disposed with multiple pores for use in connection with water inlet conduit 11, manifold 4, water outlet conduit 5, the water inlet conduit 11, manifold 4, water outlet conduit 5 and water chamber 41 are formed into a single structure and disposed inside the main body 1.

In the present embodiment of the current invention, the valve is disposed with more than one valve, where the valve has a manual switch 2 and a solenoid switch 3. FIG. 1 shows a frontal view of the manual switch 2, an end of the main body 1 is disposed with a water inlet conduit 11, the manifold 4 extends into a first water outlet opening 411 and further into a water chamber 41, which is further connected to a second water outlet 412 and then introduced into a third water passage 44, a third water outlet opening 51 and a water conduit (not shown in FIGs.). The third water outlet opening 51 extends away from the main body 1, the frontal face of the main body 1 is disposed with a manual valve switch 2 having a rotating lever 21, the rotating lever 21 is a controller for an operable valve 22. In one embodiment of the present invention, there is an instruction label showing on one surface of the rotating lever 21 that the surface of the main body 1 is labeled with symbols A, B, C, where A represents automatic mode (AUTO), indicating that the solenoid switch 3 is turned to an automatic mode, B represents on-state (ON), indicating that the manual switch 2 is turned on, C represents off-state (OFF), indicating that the manual switch 2 is engaged in forcing the solenoid valve to exit a water discharge mode; and third water outlet openings 51 are installed on corresponding ends of each valve.

Figure 2:
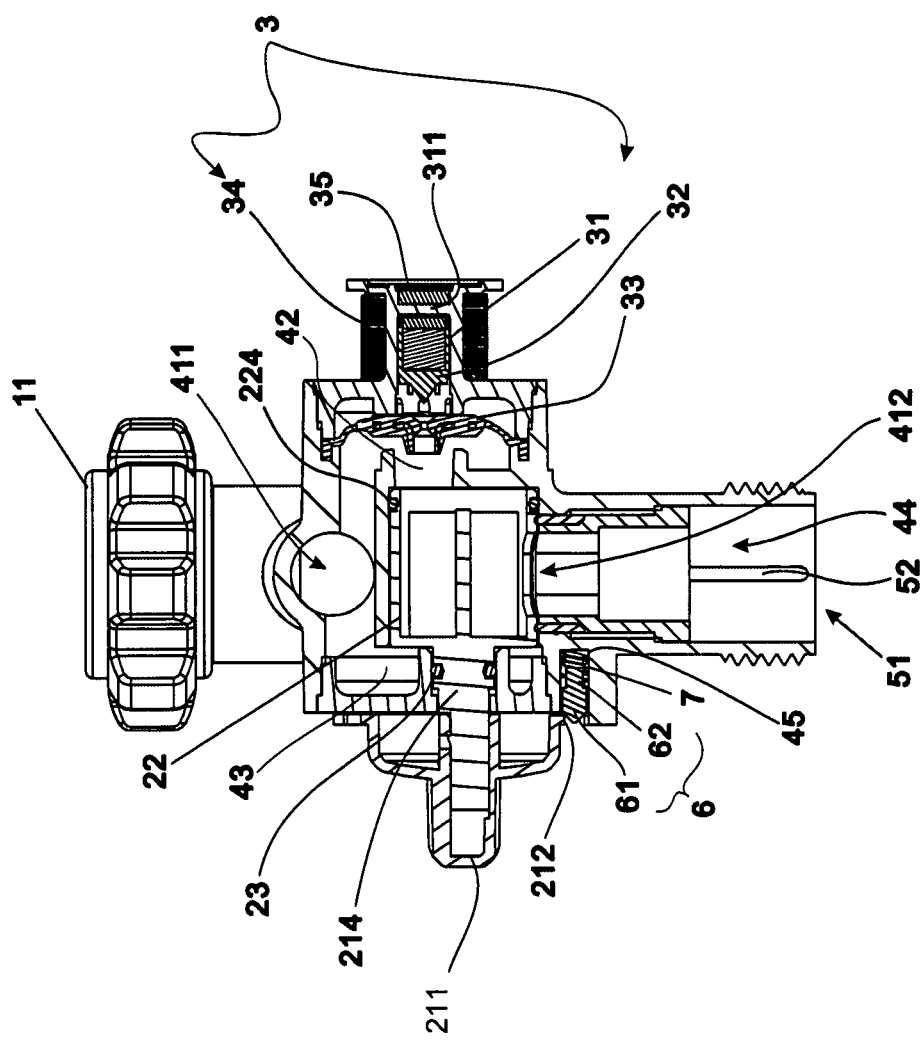
FIG. 2 is a cross-sectional view of the valve according to the current invention.
Figure 3:
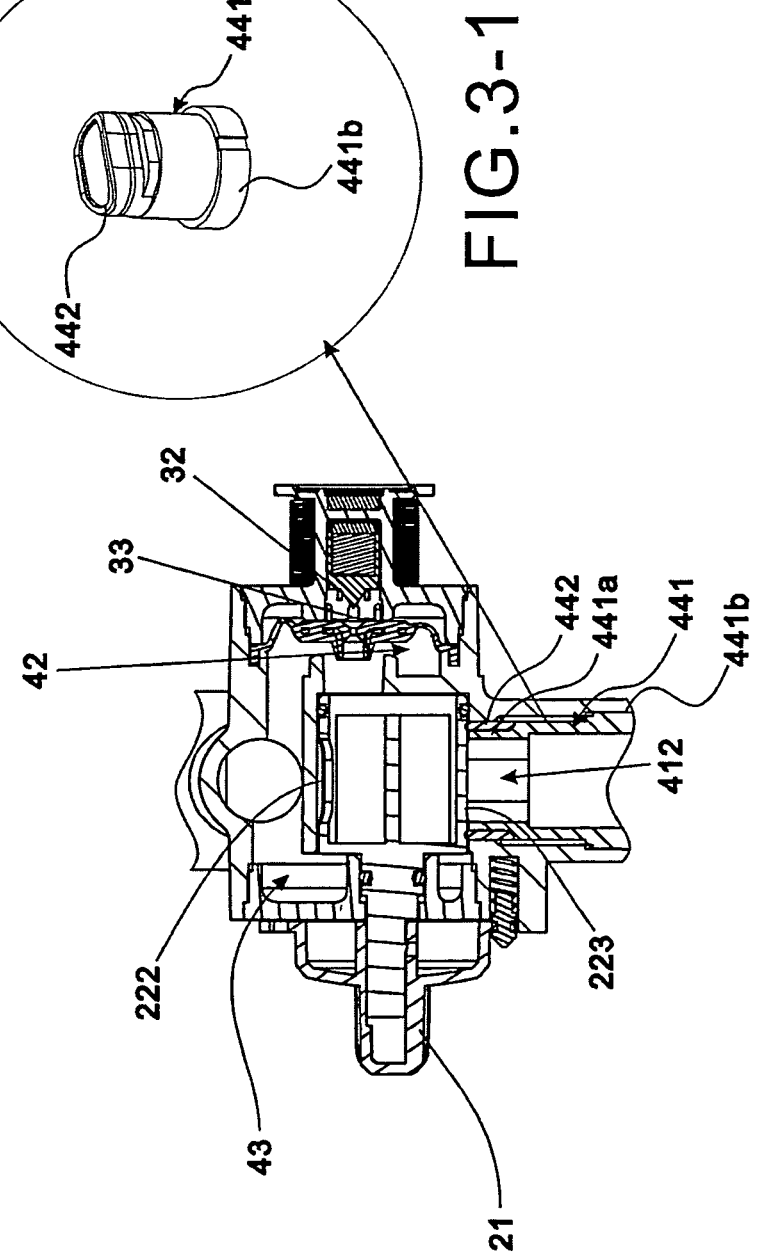
FIG. 3 is an enlarged sectional-sectional view of the valve according to the current invention.

As shown in FIGS. 2 to 10, the water inlet conduit 11 is disposed on one end of the main body 1, the manifold 4 stems from a part of the water inlet conduit 11 and extends to form into a number of bifurcating water conduits. Inside each manifold 4 there is disposed with a manual switch 2 and a solenoid switch 3, the manual switch 2 is disposed on a corresponding position relative to the solenoid switch. More specifically, the manual switch 2 communicates with one end of the third water passage 44 of the solenoid switch 3. With regard to the manifold 4, each manifold houses a water chamber 41, an inside of the water chamber is disposed with a valve, the valve comprises interchangeably corresponding manual switch 2 and solenoid switch 3, the solenoid switch 3 comprises: a connecting pipe 31, a valve stem 32, a seat 33, an electromagnetic coil 34 and a magnet 35, the water outlet conduit 5 is disposed on its inside two stabilizers 52, which are designed to provide a means for arranging the two default grooved sections 441c of the water leakage prevention device 441 to service a rail track function. The water leakage prevention device 441 has a first port 441a and a second port 441b and two grooved sections 441c. The first port 441a appears as a pipe opening, the first port 441a faces toward the second water outlet opening 412, and a third gasket is inserted on the first port 441a, so as to offer an equipment for sealing for resolving dripping of the second water outlet opening 412. As shown in FIG. 3, the inner diameter and width of the third gasket 442 substantially matches the outer diameter and width of the first port 441a, and is inserted onto the first port 441a and has a surface protruding away from the first port 441a, the third gasket 442 is made of a soft plastic material.

The connecting pipe 31 is disposed on one end of the water chamber 41, and an inside of the connecting pipe 31 has a partitioning wall 311 to separate the space into a front space and a back space, a magnet 35 is disposed in the back space, a movable valve stem 32 is disposed inside the front space. The distal end of the valve stem is a valve plug having a conical shape, which can work to seal or open the seat 33 by way of mechanical displacement. The seat 33 is located at an engaging place between the outlet opening of the connecting pipe 31 and the first water passage 42, the connecting pipe 31 has an electromagnetic coil wrung around the outside of the connecting pipe. The electromagnetic coil 34 is connected to the electrical circuit and provides for circuit conversion to turn on and off the conductive state of the electromagnetic coil 34 so as to change the polarity of the valve between positive or negative. Polarity of one end of the valve stem 32 is negative and another end of the valve stem 32 is positive, transition of state between each is obtained by way of electromagnetic coil 34, so as to separate the valve stem 32 and the magnet 35, or attract valve stem 32 and the magnet 35 together. The vale 33 is placed at an engaging place between a connecting pipe 31 and a first water passage 42, or the valve stem 32 is attracted to the valve stem 32 to open the first water passage 42.

The magnet 35 is disposed at one end of the connecting pipe 31 and is separated through a partitioning wall 311 and fixed at a specific location, and is electrically connected to an electromagnetic coil 34. The valve stem 32 installed inside the connecting pipe is disposed on another surface of the partitioning wall 311. The valve stem 32 is free to move in an axial direction inside the connecting pipe 31, an end of the valve stem 32 is a valve plug, which can push against the valve 33 to provide a means for sealing the first water passage 42 or exit the valve 33 to provide a means for opening the first water passage 42. When the electromagnetic valve closes the first water passage 42, an electrically turned-on electromagnetic coil 34 would produce a magnetic polarity opposite to the magnetic polarity of one end of the valve stem 32, which will make the valve stem 32 to detach from the magnet 35, and instantly become subject to a reverse movement, making the vale stem 32 to closely push against the valve 33 and therefore close the first water passage 42. Furthermore, when the electromagnetic coil 34 is electrically turned-on to produce a magnetic polarity attractive to an end of the valve stem 32, making the valve stem 32 attracted to the magnet 35, the valve stem 32 is dislodged from the valve 33, leaving the valve 33 to an open sate to allow water flow at the first water passage 42 for directing the water flow to go into the third water passage 44.

Figure 4:
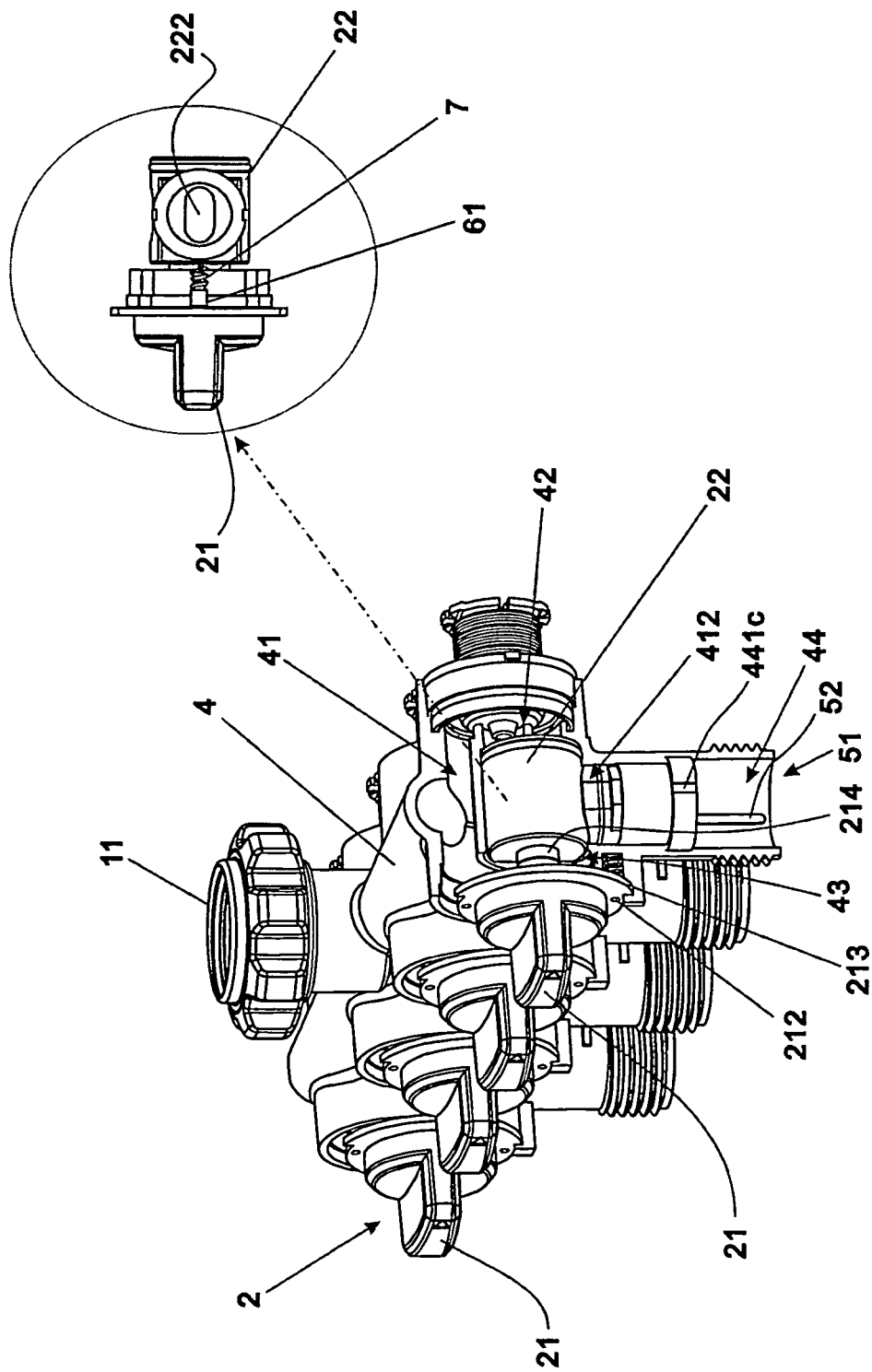
FIG. 4 is a perspective view of the valve shown in FIG. 1.

As shown in FIGS. 2 and 4, the manual switch 2 comprises a rotating lever 21 and valve 22, the rotating valve 21 is a means for controlling the axial rotation of the valve 22. The rotation of the valve 22 is deemed as an option for opening or closing the first water passage 42 and second water passage 43. The rotating lever 21 comprise a driver 211, a base disc 213, a shaft 214, a positioning device 6 and a first gasket 23. The driver 211 provides a torsional functionality of the rotating lever 21, which is disposed on an outer surface of the main body 1, which extends from an inside of the main body to expand into a base disc 213. The base disc 213 is disposed with positioning hole 212, the positioning hole 213 is used as a wedge to push against the positioning device 6 when the driver 211 turns. The shaft 214 is disposed on another end of the rotating lever 21, and extends to stick outward to connect with the valve 22. The first gasket 23 is inserted into onto the grooved section of the outer diameter of the shaft 214, so as to prevent water leakage from the water chamber 41. The first gasket 23 is made from a soft plastic material.

The valve 22 is a cylindrical valve and has a valve port 222, a valve plane 221, a closed portion 223, a second gasket 224 and a valve blocking portion 225. The valve port 222 provides a way for the water to flow from the first water passage 42 to the second water outlet opening 412, and offers use for water discharge when the solenoid switch 3 is turned on. The valve plane 221 serves to direct water flowing from the manifold 4 to go into the second water outlet opening 412 via the second water passage 43. The closed portion 223 serves to seal the first water outlet opening 411 so as to force close the on-state of the solenoid valve. The second gasket 224 is inserted onto grooved section of outer diameter of a cylindrical valve 22 such that water flow from the water inlet opening 226 of the second water passage 43, through valve port, to the second water outlet opening, can be prevented. The second gasket 224 is made by a soft plastic material. The valve blocking portion 225 is disposed at the valve 22 facing one end of the first water passage 42, or opens the first water passage 42 when the valve 33 is detached from the valve blocking portion 225.

The positioning device 6 is disposed at an inside surface opposite to the base disc 213 of the rotating lever 21. An inside of a pre-established assembly space 45 disposed on the outer surface of the water chamber 41 comprises an expansion portion 61 and a shrinkage portion 62, which are installed with a spring inside the assembly space 45. One end of the spring 7 is inserted onto the shrinkage portion 62 and pushes against the expansion portion 61, another end of the spring 7 is disposed inside the assembly space 45. The shrinkage portion 62 is placed in the inner storage space of the spring 7, the expansion portion 61 substantially pushes against the outer wall of the spring, making the expansion portion 61 to protrude away from the exterior surface of the spring 7's storage space, such that a distal end of the expansion portion 61 can always make the rotating lever 21 to hanker into a secured spot when the positioning hole 212 of the bas disc 213 is set into a desired location, when the every time the rotating lever 21 is turned.

Figure 5:
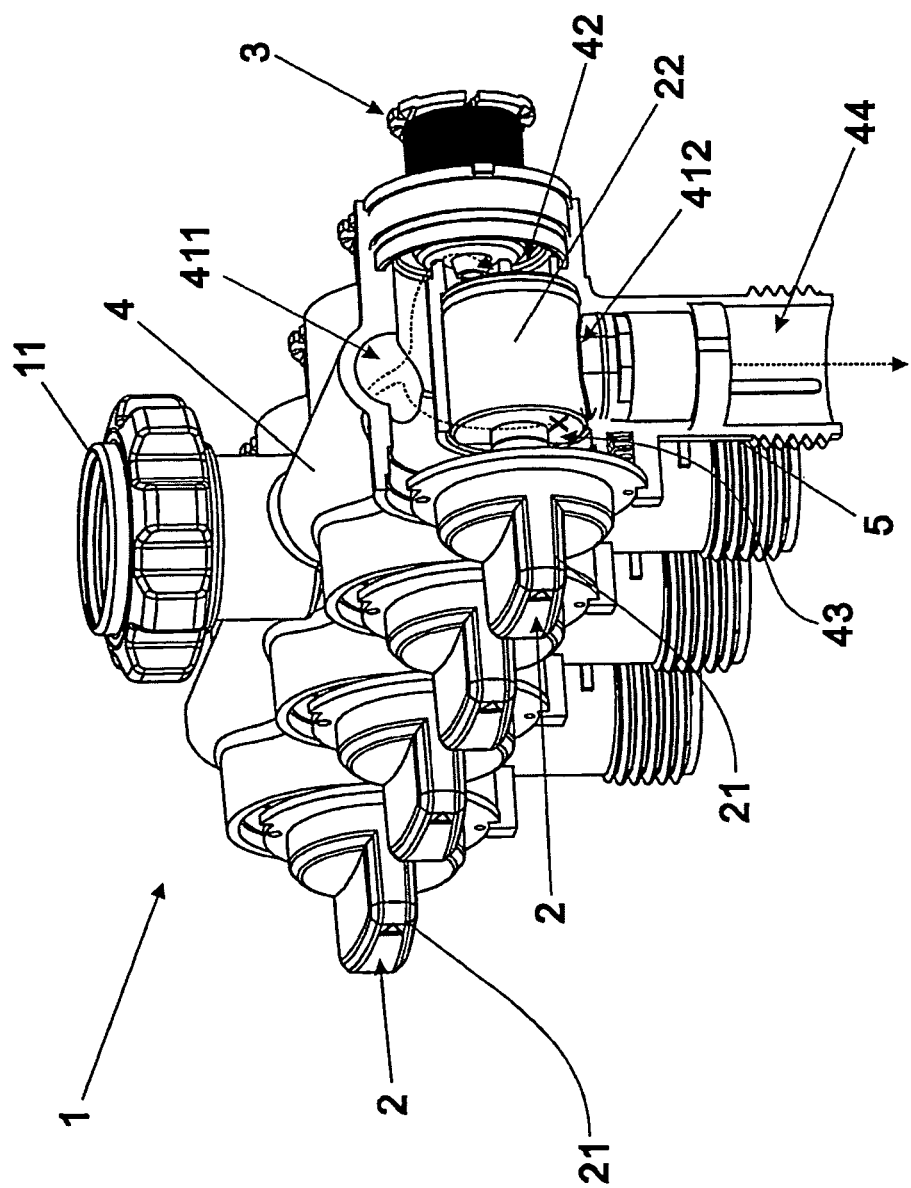
FIG. 5 is a perspective view of first embodiment of the valve according to the current invention.
Figure 6:
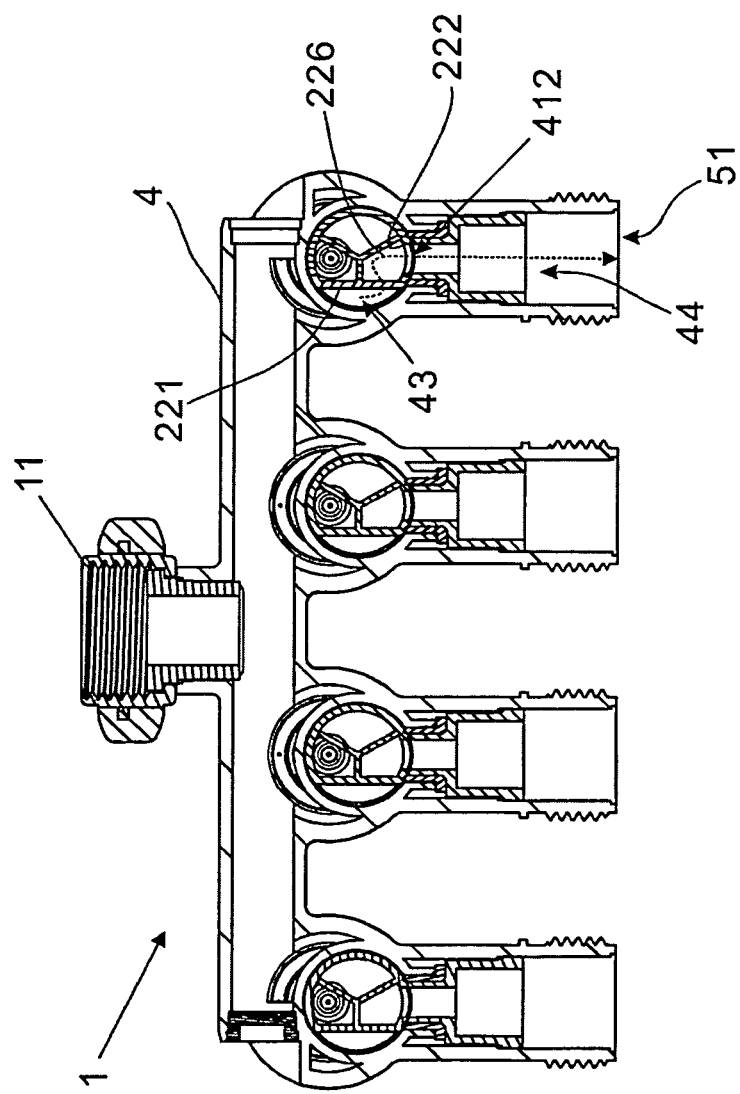
FIG. 6 is a frontal cross-sectional view of first embodiment of the valve according to the current invention.
Figure 7:
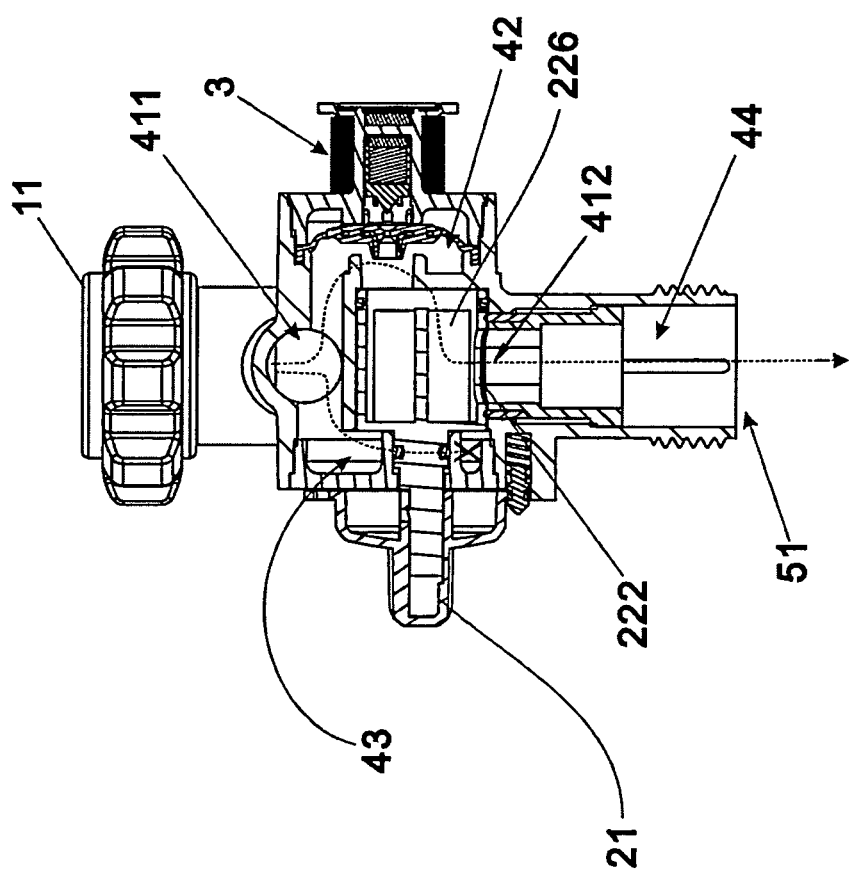
FIG. 7 is a side cross-sectional view of first embodiment of the valve according to the current invention.

FIGS. 5 to 7 show views of the valve operating in an automatic mode. When the rotating lever 21 is dialed to the automatic symbol A (AUTO), the valve port 22 of the valve will turn to face the second water outlet opening 412, the second water passage 43 is sealed. The first water outlet opening 411 is opened and communicates with the first water passage 42, and this is where the water of the water passage flows from. The objective to achieve automatic water turn-on by use of solenoid valve and water close-off by use of manual switch is such that when the solenoid valve is turned on, water discharging from the first water passage 42 can flow into the water inlet opening 226 through the valve 22, and into the third water passage 44 through the valve port 222. Furthermore, when the solenoid switch 3 presents a shut-down condition for the first water passage 42, the valve stem 32 will seal the seat 33 with the valve plug. A wall of the corresponding seat 33 works to push against the valve blocking portion 225 of the valve 22. This is essentially to mean that water discharge from the first water passage 42 and the second water passage 43 are sealed off at the same time. The purpose of this is to contribute to automatic water shut-down by use of solenoid switch.

Figure 8:
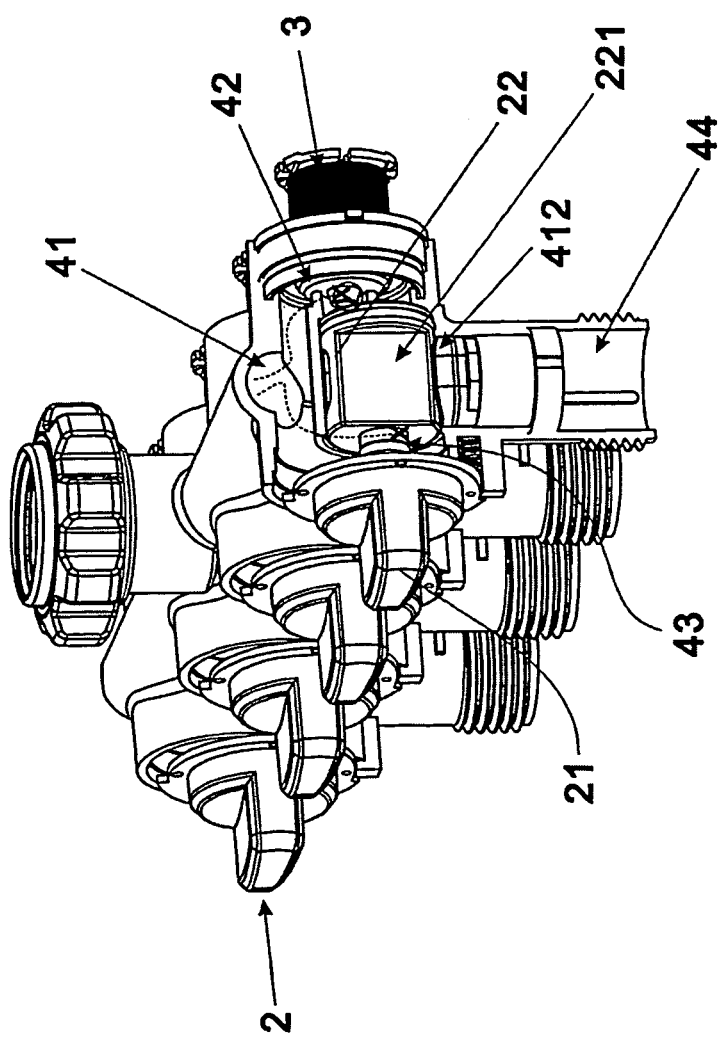
FIG. 8 is a perspective view of second embodiment of the valve according to the current invention.
Figure 9:
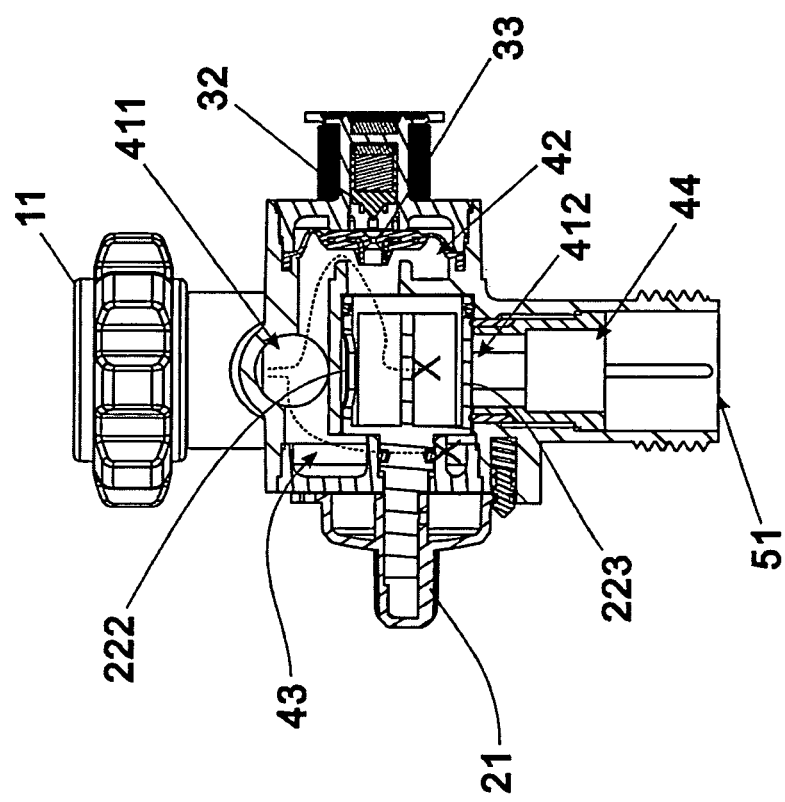
FIG. 9 is a perspective view of second embodiment of the valve according to the current invention.
Figure 10:
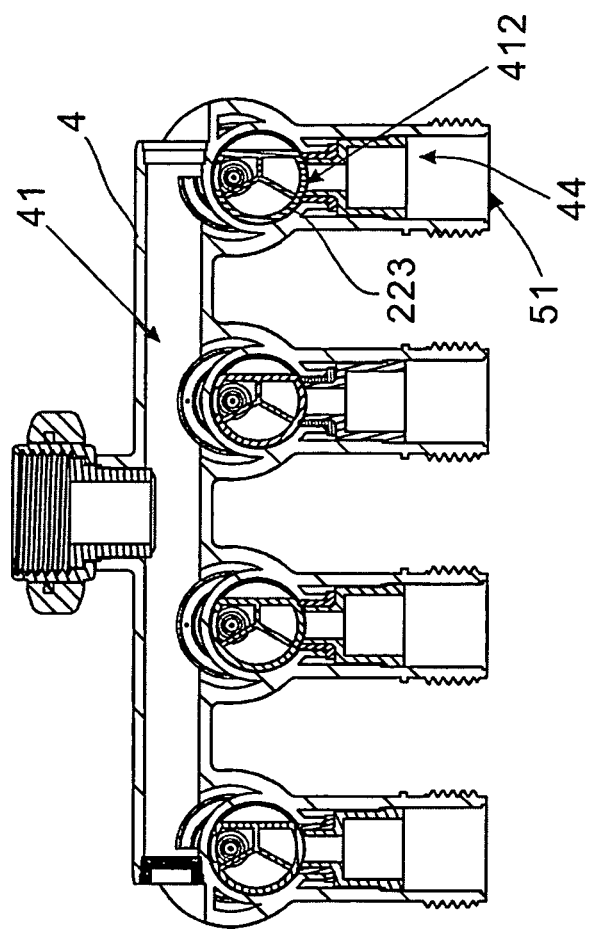
FIG. 10 is a frontal cross-sectional view of second embodiment of the valve according to the current invention.

FIGS. 8 and 10 show examples highlighting the instruction labels pointing to the symbol C (OFF), the closed portion 223 of the valve 22 pushes against the first water outlet opening 411 and the second water outlet opening 412 in order to prevent the water from the first water passage 42 and the second water passage 43 from leaking. Even if the solenoid switch 3 appears to be in an on-state, water discharge from the first water passage 42 and the second water passage 43 will be sealed by the valve port of the valve 22. The purpose of this is contributive to enabling manual force shut-down of water.

Figure 11:
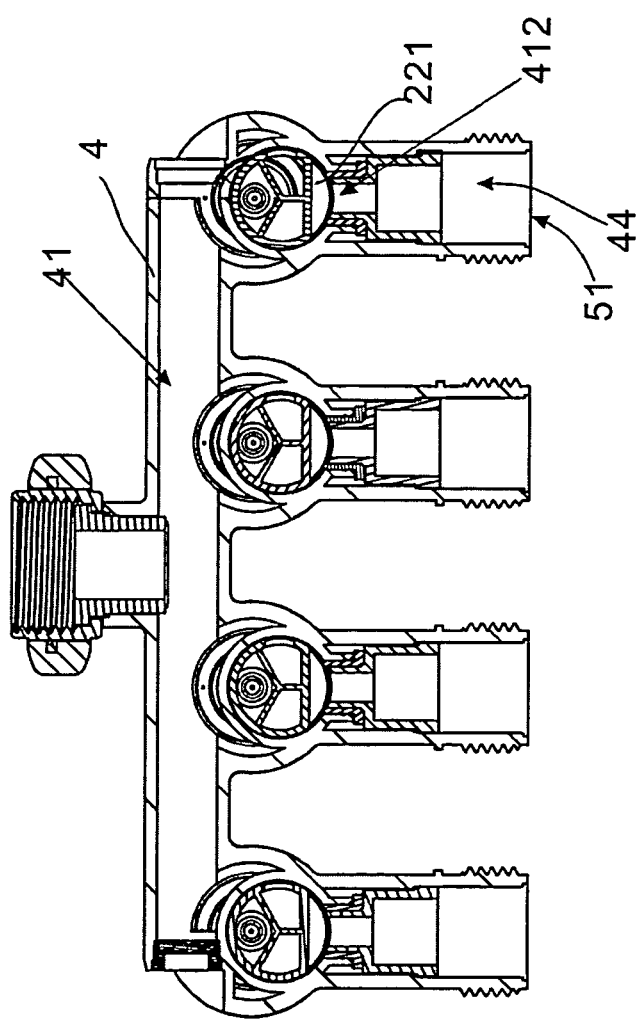
FIG. 11 is a side cross-sectional view of third embodiment of the valve according to the current invention.
Figure 12:
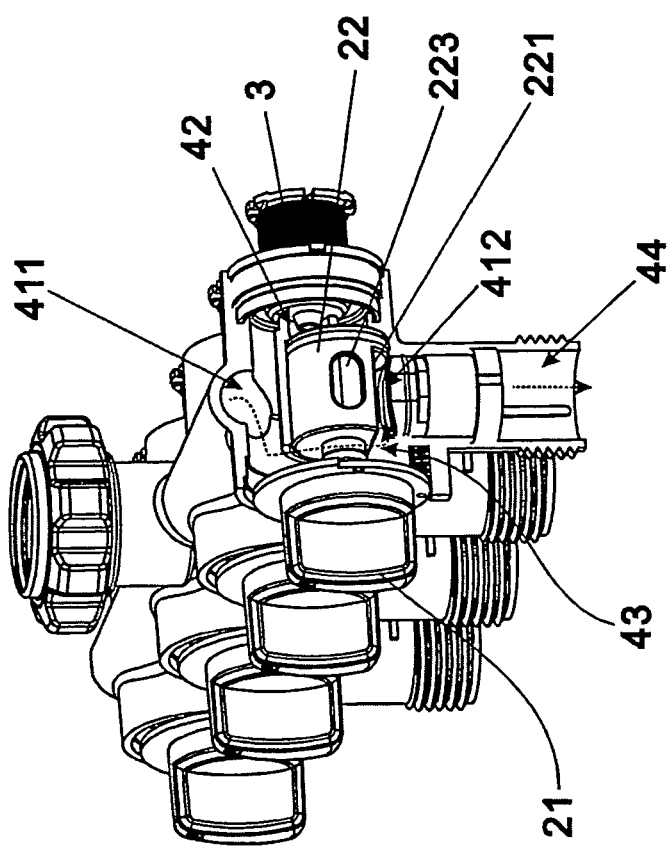
FIG. 12 is a perspective view of third embodiment of the valve according to the current invention.
Figure 13:
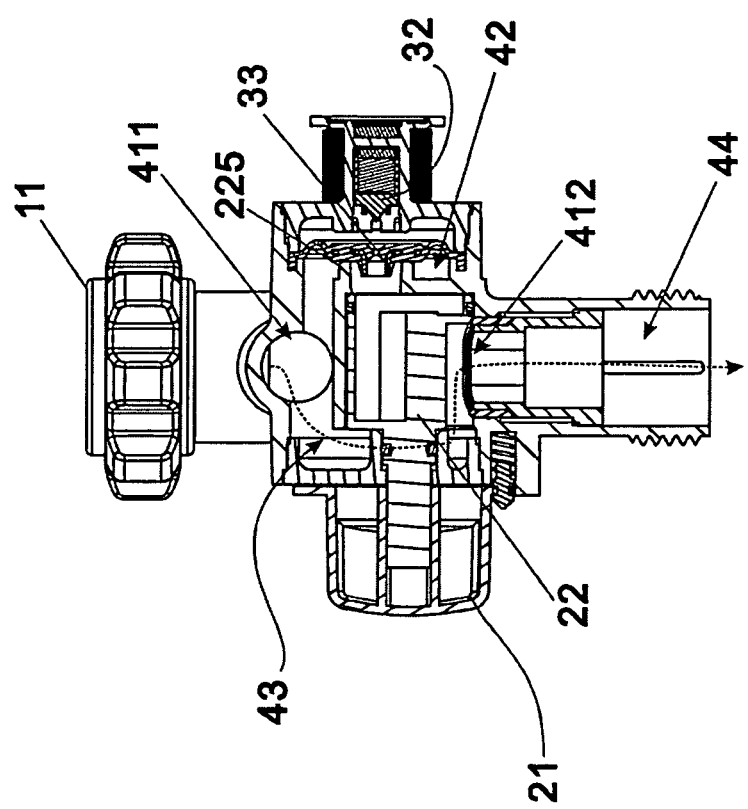
FIG. 13 is a side cross-sectional view of fourth embodiment of the valve according to the current invention.

As shown in FIGS. 11 to 13, examples are shown for situations where the rotating lever 21 points to the symbol B (ON). In this condition, the valve plane 221 of the valve 22 is turned to the second water outlet opening 412. The design here is configured in such a way that even if the second water outlet opening 412 is opened and can communicate with the second water passage 43, and this is where the water of the water passage flows from. When the first water passage 42 of the solenoid switch is closed, the water discharge from the second water passage 43 can flow into the second water outlet opening 412, and the water discharge from the third water passage 44 can flow into the third water outlet opening 51. This is designed to allow for force opening for water by use of manual switch.

The invention has been described herein by illustration of a preferred exemplary embodiment. The specification and drawings are, accordingly, to be regarded in an illustrative rather than a restrictive sense. Further, it will be apparent to those skilled in the art that other embodiments having equivalent modification and change are possible within the scope of the invention.

What is claimed is:

1. A valve apparatus oriented for irrigation system which is activated by a control unit; the valve apparatus comprises: a main body, a water inlet, a manifold, a water outlet, a solenoid switch and a manual switch, wherein the main body is a casing for building an assembly, the water inlet is disposed on one end of the main body, the manifold is a part that diverges into one or more than one water channels, wherein each manifold is internally disposed with said manual switch and said solenoid switch, which are characterized in that the manual switch is disposed at a position relative to the solenoid switch, the manual switch comprises:

a rotating lever capable of axial rotation to regulate a valve to govern opening and closing of the water channels, wherein the rotating lever comprises a first gasket;

the valve apparatus has a cylindrical shape, and has an opening, a plane, a closed portion, a second gasket and a blocking portion, the opening provides for water to flow from a first water channel to a second water outlet, the closed portion provides for closing the first water outlet to compulsorily turn off the solenoid switch so as to allow the manual switch to operate for compulsory shutdown or compulsory turn-on for water.

2. The valve apparatus oriented for irrigation system according to claim 1, wherein the rotating lever comprises a driver, base disc, shaft, and a positioning device.

3. The valve apparatus oriented for irrigation system according to claim 2, wherein the base disc is disposed with positioning holes to engage the rotating lever with the positioning device so as to keep the rotating lever retained in a secured position as the rotating lever turns.

4. The valve apparatus oriented for irrigation system according to claim 2, wherein the positioning device comprises a spring and a shrinkage peg, the shrinkage peg has an expansion portion and a shrinkage portion, an end of the spring is inserted into the shrinkage portion to push against the expansion portion, another end of the spring is inserted into a predetermined storage portion of the manifold, and the expansion portion is configured to protrude outwardly from an outer surface of the manifold after assembly is complete so as to allow a multi-tiered positioning capability for the rotating lever.

5. The valve apparatus oriented for irrigation system according to claim 1, wherein the rotating lever is disposed on an outer surface of the main body, and extends into an interior of the main body to form the base disc.

6. The valve apparatus oriented for irrigation system according to claim 1, wherein a shaft is disposed on another end of the rotating lever, and provides an axial portion protruding outwardly and to connect with said valve.

7. The valve apparatus oriented for irrigation system according to claim 1, wherein the first gasket is disposed to surround a grooved section of the shaft so as to prevent water leakage from a storage portion.

8. The valve apparatus oriented for irrigation system according to claim 1, wherein said second gasket is disposed to surround a grooved section of the valve apparatus having the cylindrical shape, which is operable to prevent water in the second water inlet from flowing into the water inlet and flowing into the second water outlet through the opening.

9. The valve apparatus oriented for irrigation system according to claim 1, wherein the water outlet is disposed with two stabilizers which provide the means for assembly in connection with a water leakage prevention device, wherein the water leakage prevention device has two grooved sections, such that when the water leakage prevention device is inserted into the water outlet, the two predetermined grooved sections operate along the stabilizers to serve as a track for guiding motions of the stabilizers.

10. The valve apparatus oriented for irrigation system according to claim 9, wherein the water leakage prevention device has a first end having an opening and directed to point toward the second outlet, a second end, and a third gasket which is inserted into the first end to provide for closing the second water outlet as a means for preventing water leakage.

11. The valve apparatus oriented for irrigation system according to claim 10, wherein an inner diameter of the third gasket, which is made of a soft plastic material, is substantially equal to an outer diameter of the opening of the first end, and is securely inserted into the first end which has protrusion on a surface of the first end.

* * * * *